United States Patent [19]

Imai et al.

[11] Patent Number: 5,135,791
[45] Date of Patent: Aug. 4, 1992

[54] OPTICAL DEVICE

[75] Inventors: Shozaburo Imai, Toyonaka; Michihisa Isobe, Chiba; Masahiko Moritani, Niihama; Masahiro Niwano, Niihama; Kenji Manabe, Niihama, all of Japan

[73] Assignee: Sumitomo Chemical Company, Limited, Osaka, Japan

[21] Appl. No.: 616,761

[22] Filed: Nov. 20, 1990

Related U.S. Application Data

[63] Continuation of Ser. No. 262,708, Oct. 26, 1988, abandoned, which is a continuation-in-part of Ser. No. 937,333, Dec. 3, 1986, abandoned.

[30] Foreign Application Priority Data

Dec. 6, 1985 [JP] Japan .................... 60-275593
Aug. 8, 1986 [JP] Japan .................... 61-187195

[51] Int. Cl.$^5$ .................... B32B 3/02; C08L 71/12
[52] U.S. Cl. .................... 428/65; 359/642; 359/831; 428/64; 428/913; 525/391; 525/905
[58] Field of Search .................... 428/65, 913, 174; 359/642, 831

[56] References Cited

U.S. PATENT DOCUMENTS

| | | |
|---|---|---|
| 3,306,875 | 2/1967 | Hay . |
| 3,356,761 | 12/1967 | Fox .................... 525/905 |
| 3,383,435 | 5/1968 | Cizek .................... 525/132 |
| 3,384,682 | 5/1968 | Erchak .................... 525/905 |
| 4,373,065 | 2/1983 | Prest . |
| 4,390,579 | 6/1983 | Dalta et al. .................... 428/65 |
| 4,610,912 | 9/1986 | Takahashi et al. .................... 428/694 |

Primary Examiner—Jacob Ziegler
Attorney, Agent, or Firm—Stevens, Davis, Miller & Mosher

[57] ABSTRACT

An optical device comprising a mixture of a polymer constituted mainly of aromatic vinyl monomer units and polyphenylene ether, characterized in that the average molecular weight of the polyphenylene ether is from 0.3 to 0.7 expressed in terms of the intrinsic viscosity measured in chloroform at 25° C.

3 Claims, No Drawings

OPTICAL DEVICE

This application is a continuation of application Ser. No. 07/262,708, filed Oct. 26, 1988, which in turn is a continuation-in-part of application Ser. No. 06/937,333, filed Dec. 3, 1986, now both abandoned.

BACKGROUND OF THE INVENTION

1. Field of the Invention

The present invention relates to small-birefringent optical devices which are useful, for example, as optical disk substrates for recording and reproducing information optically, lenses, prisms, etc.

2. Description of the Prior Arts

Recently there is noticed the system of recording and reproducing high-density information, e.g. images and/or sounds, by using laser beams, wherein the information is recorded in the form of fine projections or depressions on disk substrates or in the form of changes in an optical property of recording films formed on disk substrates.

Disk substrates for use in the above recording and reproducing system are required to be transparent and in addition have such properties as good dimensional stability, high optical homogeneity, and small birefringence.

A plenty of duplicated substrates can be economically produced by using a resin material as a material of the disk substrate. However, it is widely recognized that the resin flows during the molding of the disk substrate and molecules are oriented during cooling so that birefringence is induced. This is a fatal defect for optical disk substrates.

The molecular orientation caused during molding is inevitable particularly in injection molding. From these point of view, a polymer comprising methyl methacrylate is the only resin material with small optical anisotropy for molding of disk substrates.

Known polymer comprising methyl methacrylate, however, have a drawback in that because of their high hygroscopicity, substrates formed thereof are inferior in dimensional stability, that is, the substrate warps and/or twists in high humid atmosphere.

This drawback is as described in detail, for example, in Nikkei Electronics (p. 133, issued Jun. 7, 1982). Therefore, aromatic polycarbonate resins having low hygroscopicity are in use as materials for acoustic compact disks.

On the other hand, it is difficult to decrease the birefringence of the molded substrates formed of aromatic carbonate resins since they contain aromatic rings, which have large anisotropy, in the backbone chain. While decreasing of the molecular weight and conditions of the molding are under investigation. However, since birefringence of the substrate originates from the material itself, it is impossible to constantly produce substrate with small birefringence and it is extremely difficult at present to produce small-birefringent substrates larger in diameter than acoustic compact disk by injection molding.

To improve dimensional stability which is a drawback of the polymer comprising methyl methacrylate, copolymers comprising methyl methacrylate and aromatic vinyl monomer are proposed [e.g. Japanese Patent Application (Laid-Open) Nos. 33446/82, 162135/82, and 88843/83]. However, these copolymer having aromatic rings cannot be practical use on account of their liability to large birefringence. For the disk substrates which is used not only for reproducing but also recording of information, a material is required to have further small birefringence and dimensional stability, but no resin has yet been found out that can enough satisfy these requirements.

With respect to other optical devices including lenses and prims, for which methacrylic resins and the like have been used as materials, there are needs for optical devices formed from a resin which is further small birefringence and superior in heat resistance, mechanical strength, and dimensional stability.

U.S. Pat. No. 4,373,065 discloses an optical recording device comprising an optically isotropic composition prepared by mixing two resins which have opposite optical anisotropies but are completely miscible with each other, in such a ratio that their optical anisotropies will be just compensated with each other to reduce the birefringence to substantial zero.

This patent further describes mixtures prepared by using a polyphenylene ether and polystyrene as component polymers having opposite optical anisotropies and showed that a film prepared such a composition of the mixtures that these anisotropies are just compensated with each other does not cause birefringence even when the film is stretched under the stress.

However, this patent does not reveal that an optical device such as an optical disk substrate, when formed from the above polymer composition by injection molding, exhibits small birefringence.

The present inventors have found that the birefringence of moldings such as optical disk substrates is not always small when these moldings are formed by injection molding, which is recently the most common method of forming optical devices, even from a mixture of two polymers which have opposite optical anisotropies in the solid state but are completely miscible with each other, wherein the mixing ratio is such that the optical anisotropies in the solid state are just compensated with each other.

That is, it has been found that optical materials such as an optical disk substrate having small birefringence can not be obtained by injection molding of any composition of polymer mixtures that is chosen by considering merely the optical anisotropy of each polymer in the solid state.

In recent years, attemps are in progress to produce plastic substrates of magneto-optical disks where the erasing and rewritting of information are possible.

Information recorded on such an optical disk of a magneto-optical type is read by focussing a polarlized laser beam through a lens on the recording medium of the disk and detecting a Kerr effect-induced slight rotation of the polarization plane of the laser beam reflected from the recording media. Accordingly, it is necessary in this case to use an optical disk substrate which scarcely causes the birefringence for oblique incident beams as well.

In addition, the optical disk substrate is required the high heat resistance since the substrate during information writting is heated by a laser beam.

SUMMARY OF THE INVENTION

In view of such circumstances as stated above, the present inventors made intensive studies, and as a result have been successful in providing an optical device which has small birefringence for vertical incident beams as well as oblique them even when formed by injection molding, compression molding, or the like, and has high heat resistance, well-balanced mechanical strengths, and superior dimensional stability.

According to the present invention, there is provided an optical device comprising a mixture of a polymer constituted mainly of aromatic vinyl monomer units and polyphenylene ether.

DETAILED DESCRIPTION OF THE INVENTION

The optical device of the invention includes, for example, magneto-optical disk substrates, lenses, and prisms, besides common optical disk substrates.

The present inventive optical device comprises a mixture of a polymer constituted mainly of aromatic vinyl monomer units and polyphenylene ether.

The polymer constituted mainly of aromatic vinyl monomer units, referred to in the invention, is an aromatic vinyl homopolymer or a copolymer comprising aromatic vinyl monomer units in an amount of greater than 50% by weight. Examples of the aromatic vinyl monomers include styrene, α-methylstyrene, m-methylstyrene, p-methylstyrene, o-chlorostyrene, m-chlorostyrene, p-chlorostyrene, m-bromostyrene, and p-bromostyrene. In particular, styrene is favorably used.

Suitable monomers herein for copolymerization with such an aromatic vinyl monomer include; unsaturated nitriles, e.g. acrylonitrile and methacrylonitrile; alkyl methacrylates, e.g. methyl methacrylate, n-propyl methacrylate, isopropyl methacrylate, n-butyl methacrylate, and cyclohexyl methacrylate; alkyl acrylates, e.g. methyl acrylate, ethyl acrylate, propyl acrylate, and butyl acrylate, and further, methacrylic acid, acrylic acid, maleic anhydride, citraconic anhydride, N-methylmaleimide, and N-phenylmaleimide.

These comonomers may be used alone or in combination, wherein the kinds and proportions of monomers used may be suitably chosen within the range thereof where none of them impair the transparency of the resulting polymer composition that comprises an aromatic vinyl copolymer and a polyphenylene ether.

The proportion of the aromatic vinyl monomer in the monomer mixture to form the copolymer is desired to be at least 50% by weight, otherwise the resulting resin will have undesirably high hygroscopicity.

The melt fluidity of the polymer constituted mainly of aromatic vinyl monomer units, expressed in melt flow rate (MFR) at 230° C. under 3.8 kg load, is desirably from 0.5 to 200, preferably from 2 to 100. When the MFR exceeds 200, the polymer is poor in mechanical strength and when the MFR is less than 0.5, the birefringence is difficult to decrease.

The polymer constituted mainly of aromatic vinyl monomer units may be produced by any of bulk, suspension, emulsion, and solution polymerization methods using a radical initiator, but bulk polymerization and suspension polymerization are preferable in view of the productivity and less impurity-contamination of the polymer.

Suitable radical initiators for the polymerization include peroxides, e.g. lauroyl peroxide, benzoyl peroxide, di-tert-butyl peroxide, and dicumyl peroxide, and azo compounds, e.g. 2,2'-azobisisobutyronitrile and 1,1'-azobis(1-cyclohexanecarbonitrile).

If necessary for controlling the molecular weight, such a chain transfer agent is added as tert-butyl, n-butyl, n-octyl, n-dodecyl, or tert-dodecyl mercaptan.

The polymerization is generally carried out at a temperature of 50 to 150° C.

The polyphenylene ether referred to in the present invention is a polymer consisting of recurring units represented by the formula

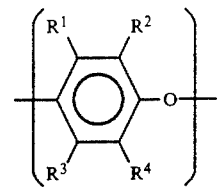

wherein each of $R^1$, $R^2$, $R^3$, and $R^4$ denotes hydrogen, halogen, or hydrocarbon groups.

Polyphenylene ethers, defined above, are readily prepared by known methods (see, e.g. Japanese Patent Publication Nos. 18692/61 and 36518/72), that is, by oxidative coupling of phenolic monomers in the presence of a copper or manganese catalyst.

Examples of the polyphenylene ethers include poly(2,6-dimethyl-1,4-phenylene) ether, poly(2-methyl-6-ethyl-1,4-phenylene) ether, poly(2-methyl-6-propyl-1,4-phenylene)ether, poly(2,6-dipropyl-1,4-phenylene)ether, and poly(2-methyl-6-bromo-1,4-phenylene)ether. In particular, poly(2,6-dimethyl-1,4-phenylene)ether is preferable.

In the present invention, polypnenylene ether resins generally in use as engineering plastics are acceptable but those of lower molecular weights are preferred.

That is, when the average molecular weight of polyphenylene ether is expressed in terms of the intrinsic viscosity of the polymer in chloroform at 25° C., acceptable values thereof are 0.1 to 1.0, but desirable are 0.3 to 0.7, preferable 0.3 to 0.45, and particularly preferable 0.35 to 0.42. When the value is less than 0.3, the resulting optical device will have poor mechanical strength.

For decreasing the birefringence, particularly that power for obliquely incident beams, the intrinsic viscosity of the polyphenylene ether to use is desired to be up to 0.45.

This is conceivably because the aromatic vinyl-based polymer and the polyphenylene ether, during molding, e.g. injection molding, to form optical devices, are different in tendency to molecular orientation and/or in relaxation speed in a mold.

That is; polyphenylene ethers in molding exhibit inherently high melt viscosity and tend to develop molecular orientation, which is liable to remain after molding; but when a polyphenylene ether of lower average molecular weight is used for molding optical devices, the orientation of polyphenylene ether molecules in the resin mixture will occur more hardly and the relaxation speed will be higher; therefore optical devices exhibiting for vertical incident beams as well as oblique them will be obtained from a wider range of resin composition under wider ranges of injection molding conditions.

In the present invention, melt or solution mixing is suitable for preparing the resin material of optical devices by mixing the aromatic vinyl-based polymer and the polyphenylene ether.

The melt mixing is carried out by using a mixing machine such as an extruder, Banbary mixer, kneader blender, or heat roller mill under high shear stress at temperatures of at least the glass transition point of the polyphenylene ether.

The degree of mixing is such that particles sizes of both the mixed and dispersed polymers become desirably about 1μ or less, preferably of molecular order. Whether the molecular-order dispersion is reached can be readily judged by observing the mixture to exhibit a single glass transition temperature.

For achieving the much satisfactory state of mixing, the means are taken of raising the mixing temperature, extending the mixing period, and further enhancing the shear stress.

In the melt mixing, an organic solvent may be used in a small amount as a plasticizer for lowering the glass transition temperature of both the polymers, thereby facilitating the mixing.

Organic solvents, as cited below, suitable for the solution mixing can also be used in this case. The used solvent may be removed by distillation after completion of the mixing.

The solution mixing can be accomplished by dissolving each polymer in an organic solvent to a concentration of at least 1% by weight, mixing the solutions with stirring to form a uniform mixture, and either distillation of the mixture to remove the solvent or addition of a solvent poor in the ability to dissolve both the polymers to the mixture to precipitate the polymers.

Suitable solvents for the solution mixing include, for example, chloroform, toluene, benzene, and chlorobenzene. Suitable poor solvents include, for example, methanol, ethanol, propanol, n-hexane, and n-pentane.

The proportions of the aromatic vinyl-based polymer and the polyphenylene ether, in the optical device, are 30–70%, preferably 40–55%, by weight and 70–30%, preferably 60–45%, by weight, respectively. When the proportion of the polyphenylene ether is less than 30% by weight or more than 70% by weight, the birefringence of the optical device cannot be sufficiently small. In addition, when the polyphenylene ether proportion is less than 30% by weight, the optical device is insufficient for heat resistance.

The resin composition of the optical device, in practice, is suitably chosen within the above defined range depending on the method of molding. In injection molding, for example, the resin proportions may be suitably chosen depending on preset conditions of molding, such as resin temperature, injection pressure, and mold temperature so that the birefringence of the moldings will agree with the level required to use the product for the intended purposes.

Optical devices, particularly optical disk substrates, of the present invention in certain applications transmit semiconductor laser beams or the like. Accordingly, the light transmittance of optical devices for such applications is desired to be at least 75% at a wavelength of 800 nm when the thickness of optical device is 1.2 mm.

Of the optical devices of the present invention, optical disk substrates can be formed by injection molding, compression molding, and injection-compression molding. The effect of the present invention is the more remarkable when a molding method, among the above, is applied that tends to form the higher birefringent products, though injection molding is best suited in view of productivity.

The injection molding referred to herein a method for moldings which comprises heating a resin to a fluid state, forcing the resin into a closed mold cavity, and solidifying the resin by cooling.

This simple injection molding method may be combined with the mold cavity evacuating method or the injection-compression molding method may be applied.

When the optical device of the present invention is produced by injection molding, a melted and plasticized resin is injected at a temperature of desirably from 270° to 350° C., preferably from 300° to 340° C.

This temperature is of the resin, in the injection cylinder, which has been melted and plasticized by heating with external heaters and with shear heat generated by screw revolution in the injection molding machine.

When this resin temperature is below 270° C., the resulting optical disk substrate is unsuitable for the intended application since the degree of birefringence will become 20 nm or more. When the resin temperature exceeds 350° C., the resin decomposes, develops defective phenomena such as burnings and silver flow marks and bit errors on the resulting optical disk substrate will markedly increase, thus the substrate being unsuitable.

In the injection molding, the mold temperature is maintained at a temperature of desirably from 50° to 140° C., preferably from 80° to 120° C. The mold temperature referred to herein is the surface temperature of the mold cavity immediately before injection. When the mold temperature is below 50° C., the reproducibility of finely engraved grooves on the mold cavity surface becomes worse and when the mold temperature exceeds 140° C., the releasability of the molded resin from the mold becomes worse.

In the present invention, the injection period is in the range of desirably from 0.2 to 3.0 seconds, preferably from 0.3 to 2 seconds. The injection period referred to herein is the period of time taken for filling the resin into the mold cavity. Injection periods shorter than 0.2 second are responsible for silver flow marks and will result in increased bit errors when the moldings are used as an optical disk. Injection periods longer than 3 seconds undesirably cause the resulting optical disk substrate to exhibit high birefringence power corresponding to 20 nm or more.

The following examples illustrate the present invention in more detail without limiting the scope of the invention. In the examples, parts and percentages are all by weight.

Physical properties shown in the examples were measured in the following ways.

Birefringence: Using a polarization microscope, the retardation was measured at a wavelength of 546 nm according to the Cenarmont compensator method.

Water absorption: Equilibrium water absorption in water at 60° C. was measured in accordance with ASTM D-570.

Light transmittance: The transmittance of a 1.2-mm thick specimen was measured at a wavelength of 800 nm using a self recording spectrophotometer Model 330 supplied by Hitachi, Ltd.

Flexural properties: Measured in accordance with ASTM D-790.

Heat resistance: Expressed in terms of the glass transition temperature measured by the linear expansion coefficient method.

Intrinsic viscosity of polymer: Measured in chloroform at 25° C. using Ubblohde viscometers.

The kneading and pelletizing was carried out by using a twin-screw extruder (Model TEX30-30BW-2V, supplied by the Japan Steel Works, Ltd.).

The injection molding was carried out by using an injection molding machine (Neomat Model 150/75 (75 ton), supplied by Sumitomo Heavy Industries, Ltd.) and a mold for producing a disk 120 mm across and 1.2 mm thick.

Example 1

Into a four-necked flask equipped with a thermometer, a reflux condenser, a dropping funnel, a stirrer, and a gas-introducing tube, were charged 9 kg of xylene and 1.1 kg of ethanolamine. To the mixture was added with stirring 8.8 kg of a methanol solution containing 151 g of manganese (II) chloride, and oxygen was introduced therein at room temperature for 15 minutes. Subsequently, a solution containing 4.89 kg of 2,6-xylenol and 4.9 kg of xylene was charged in the flask, and while introducing oxygen the reaction was allowed to proceed with stirring at 30° C., for 5 hours. The reaction mixture was poured into a large volume of methanol containing a small amount of hydrochloric acid, and the precipitates formed were collected by filtration, washed with methanol, then with water, and dried to obtain 4.75 kg of poly(2,6-dimethyl-1,4-phenylene) ether having an intrinsic viscosity of 0.52 dl/g as measured in chloroform at 25° C.

The polyphenylene ether resin and a polystyrene resin (Tradename: Esbrite 8, general purpose grade, MFR 10, supplied by Sumitomo Chemical Co., Ltd.) were blended together in proportions shown in Table 1. This blend was kneaded and pelletized through the extruder and then injection-molded at a cylinder temperature of 320° C. and a mold temperature of 85° C. to form disks 120 mm across and 1.2 mm thick.

Results of evaluating properties of these disks are also shown in Table 1. The birefringence was measured at a position 35 mm distant from the center of the disk.

Examples 2 to 4

Disks were prepared by following the procedure of Example 1 but varying the blending proportions of the poly(2,6-dimethyl-1,4-phenylene)ether and the polystyrene resin. Results are shown in Table 1.

TABLE 1

| | Example | | | |
|---|---|---|---|---|
| | 1 | 2 | 3 | 4 |
| Poly(2,6-dimethyl-1,4-phenylene)ether, (%) | 30 | 35 | 40 | 50 |
| Polystyrene, (%) | 70 | 65 | 60 | 50 |
| Light transmittance (%) | 88 | 87 | 86 | 86 |
| Birefringence (nm) | −50 | −20 | +20 | +40 |
| Water absorption (%) | 0.1 | 0.1 | 0.1 | 0.1 |
| Glass transition temperature (°C.) | 132 | 137 | 143 | 155 |

COMPARATIVE EXAMPLE 1

Poly(2,6-dimethyl-1,4-phenylene)ether prepared in Example 1 was injection-molded alone.

The molding, infeasible under the same conditions as in Example 1, was carried out at a cylinder temperature of 350° C. and a mold temperature of 130° C.

The birefringence value was as large as 100 nm or more in absolute value.

COMPARATIVE EXAMPLE 2

The same polystyrene resin used in Example 1 was molded alone under the same conditions as in Example 1.

The birefringence was 100 nm or more in absolute value and its distribution unevenness was greate.

COMPARATIVE EXAMPLE 3

According to the ordinary method, a polycarbonate resin of average molecular weight about 15,000 was prepared by the interfacial polycondensation of bisphenol A dissolved in methylene chloride with phosgene blown into the solution, wherein t-butylphenol was used for molecular weight control.

The obtained powdery resin was pelletized through the extruder and injection-molded under the same conditions as in Example 1.

Disks thus obtained were found to cause large birefringence values of 100 nm and more.

Further, disks formed by molding the above pellets at a cylinder temperature of 340° C. gave a large birefringence value of 100 nm and showed a water absorption of 0.45. The glass transition temperature was 136° C.

The molding was further tried at a higher cylinder temperature, but at temperatures exceeding 340° C. the resin decomposed and hence was hardly molded.

EXAMPLES 5 to 16

Poly(2,6-dimethyl-1,4-phenylene)ethers of different intrinsic viscosity as shown in Table 2 were severally blended with a polystyrene resin (tradename: Esbrite 4-62A, supplied by Nihon Polystyrene Kogyo Co., Ltd.) in various proportions shown also in Table 2. These belnds were each kneaded, pelletized, and injection-molded under the conditions of 320° C. resin temperature, 100° C. mold temperature, and 1 second's injection period to prepare optical disk substrates.

Table 2 shows values of birefringence of a vertical incident beam and an oblique incident beam of 30° caused by the thus obtained optical disk substrates. The measurement position is expressed by the distance in the radial direction from the center of the optical disk substrate.

Table 2 also shows flexural properties and heat resistance of plates prepared by press-forming of pelletized resins above at 270° C.

TABLE 2

| | Composition | | | Birefringence (nm) | | | | | | Flexural property | | | |
|---|---|---|---|---|---|---|---|---|---|---|---|---|---|
| | Poly(2,6-dimethyl-1,4-phenylene)ether | | Poly- | Vertical incident beam | | | 30° oblique incident beam | | | Flexural strength | Flexural modulus | Maximum strain | Heat resistance |
| Example No. | Intrinsic viscosity | Parts | styrene Parts | At 25 mm | At 40 mm | At 55 mm | At 25 mm | At 40 mm | At 55 mm | Kg/cm$^2$ | Kg/cm$^2$ | % | °C. |
| 5 | 0.44 | 40 | 60 | −15 | −17 | −18 | −18 | −18 | −19 | 1010 | 34,800 | 3.6 | 142 |
| 6 | 0.44 | 44 | 56 | +2 | +1 | +2 | +3 | +1 | +2 | 1180 | 35,200 | 4.2 | 148 |
| 7 | 0.44 | 48 | 52 | +19 | +16 | +15 | +20 | +18 | +17 | 1160 | 35,500 | 4.5 | 153 |
| 8 | 0.40 | 46 | 54 | −13 | −10 | −12 | −9 | −10 | −10 | 1010 | 35,300 | 3.2 | 149 |

TABLE 2-continued

| | Composition | | | Birefringence (nm) | | | | | | Flexural property | | | |
|---|---|---|---|---|---|---|---|---|---|---|---|---|---|
| | Poly(2,6-di-methyl-1,4-phenylene)ether | | Poly-styrene | Vertical incident beam | | | 30° oblique incident beam | | | Flexural strength | Flexural modulus | Maximum strain | Heat resistance |
| Example No. | Intrinsic viscosity | Parts | Parts | At 25 mm | At 40 mm | At 55 mm | At 25 mm | At 40 mm | At 55 mm | Kg/cm² | Kg/cm² | % | °C. |
| 9 | 0.40 | 50 | 50 | −1 | −2 | −2 | 0 | −1 | −1 | 1080 | 35,800 | 3.5 | 154 |
| 10 | 0.40 | 54 | 46 | +10 | +11 | +12 | +12 | +12 | +12 | 1100 | 35,800 | 3.7 | 159 |
| 11 | 0.35 | 55 | 45 | −7 | −8 | −8 | −8 | −8 | −9 | 700 | 34,200 | 3.0 | 150 |
| 12 | 0.35 | 59 | 41 | 0 | −1 | −1 | 0 | 0 | −1 | 720 | 34,500 | 3.1 | 155 |
| 13 | 0.35 | 63 | 37 | +6 | +6 | +6 | +8 | +7 | +7 | 750 | 34,600 | 3.3 | 159 |
| 14 | 0.31 | 63 | 37 | −4 | −4 | −4 | −5 | −5 | −5 | 430 | 35,000 | 1.6 | 149 |
| 15 | 0.31 | 67 | 33 | +1 | +1 | +1 | +1 | 0 | 0 | 410 | 34,900 | 1.4 | 154 |
| 16 | 0.31 | 70 | 30 | +6 | +5 | +5 | +6 | +6 | +6 | 420 | 34,800 | 1.5 | 158 |

EXAMPLES 17 to 19

Poly(2,6-dimethyl-1,4-phenylene)ethers of different intrinsic viscosity as shown in Table 3 were severally blended with a styrene-maleic anhydride copolymer (tradename: Dylark 232, MFR 7.3 supplied by ARCO Chemical Co., Ltd.) in various proportions shown also in Table 3. These blends were each kneaded, pelletized, and injection-molded under the conditions of 330° C. resin temperature, 120° C. mold temperature, and 1 second's injection period to prepare optical disk substrates.

Table 3 shows values of birefringence of a vertical incident beam and an oblique incident beam of 30° caused by the thus obtained optical disk substrates. The measurement position is expressed by the distance in the radial direction from the center of the optical disk substrate.

Table 3 also shows flexural properties and heat resistance of plates prepared by press-forming of pelletized resins above at 270° C.

TABLE 3

| | Composition | | | Birefringence (nm) | | Flexural property | | | |
|---|---|---|---|---|---|---|---|---|---|
| | Poly(2,6-di-methyl-1,4-phenylene)ether | | Styrene copolymer | Vertical incident beam | 30° oblique incident beam | Flexural strength | Flexural modulus | Maximum strain | Heat resistance |
| Example No. | Intrinsic viscosity | Parts | Parts | At 40 mm | At 40 mm | Kg/cm² | Kg/cm² | % | °C. |
| 17 | 0.52 | 60 | 40 | +2 | +7 | 1150 | 34500 | 3.5 | 161 |
| 18 | 0.50 | 63 | 37 | +2 | +8 | 1210 | 33800 | 3.5 | 163 |
| 19 | 0.45 | 65 | 35 | +3 | +17 | 1220 | 35100 | 2.9 | 165 |
| 20 | 0.52 | 55 | 45 | +5 | +15 | 1080 | 34200 | 4.1 | 155 |
| 21 | 0.50 | 58 | 42 | +7 | +20 | 1150 | 34300 | 4.2 | 157 |
| 22 | 0.45 | 56 | 44 | +6 | +18 | 1190 | 33800 | 3.9 | 159 |

EXAMPLES 20 to 22

Poly(2,6-dimethyl-1,4-phenylene)ethers of different intrinsic viscosity as shown in Table 3 were severally blended with a styrene-methacrylic acid copolymer (tradename: Ryulex A-15, MFR 1.5 supplied by Dainihon Ink Chemical Co., Ltd.) in various proportions shown also in Table 3. These blends were each kneaded, pelletized, and injection-molded under the conditions of 330° C. resin temperature, 120° C. mold temperature, and 1 second's injection period to prepare optical disk substrates.

Table 3 shows values of birefringence of a vertical incident beam and an oblique incident beam of 30° caused by the thus obtained optical disk substrates. The measurement position is expressed by the distance in the radial direction from the center of the optical disk substrate.

Table 3 also shows flexural properties and heat resistance of plates prepared by press-forming of pelletized resins above at 270° C.

According to the present invention, it has become possible to provide an optical device which comprises a resin of the polystyrene family as an ingredient, said resin being less hygroscopic and good in dimensional stability but inadaptable up to now because of its highly birefringent property, and in addition has a good balance of heat resistance with mechanical strength.

In particular, the optical device comprises a specific polyphenylene ether having relatively low intrinsic viscosity as another ingredient, thereby being low birefringent for vertical incident beam as well as unprecedentedly for oblique incident beam, and additionally has wide composition latitude, hence offering high heat resistance.

The optical device of the present invention has also the advantage of possibility to mold the small birefringent moldings even when formed by injection molding that is regarded to produce large birefringence.

The present optical device includes optical disk substrates, lenses, prisms, etc. and is suited in particular for applications where light of a specific wavelength is used. The optical device is suited as a common optical disk substrate, of course, and also as a magneto-optical disk substrate because of being small birefringent for oblique incident beam, as stated above, and having high heat resistance.

What is claimed is:

1. An optical disk substrate, lens or prism which is obtained by injection molding a resin mixture of
   (a) 40 to 70% by weight of a polymer constituted mainly of aromatic-vinyl monomer units, and
   (b) 60 to 30% by weight of polyphenylene ether, the average molecular weight of the polyphenylene ether expressed in terms of the intrinsic viscosity measured in chloroform at 25° being 0.3 to 0.45, at a temperature of the resin mixture of 270° to 350° C., a mold temperature of 50° to 140° C. and an injection molding period of 0.2 to 3 seconds, wherein the optical disk substrate, lens or prism shows a birefringence of −20 nm to +20 nm and a glass transition temperature of 142° C. or more.

2. The optical disk substrate, lens or prism of claim 1, wherein the weight ratio of the polymer to the polyphenylene ether is 40–55:60–45.

3. The optical disk substrate, lens or prism of claim 1, wherein the aromatic vinyl monomer is styrene and the polyphenylene ether is poly(2,6-dimethyl-1,4-phenylene ether).

* * * * *